(12) United States Patent
Clements

(10) Patent No.: US 6,888,623 B2
(45) Date of Patent: May 3, 2005

(54) FIBER OPTIC SENSOR FOR PRECISION 3-D POSITION MEASUREMENT

(75) Inventor: Gregory Minot Clements, Falls Church, VA (US)

(73) Assignee: Dynamic Technology, Inc., Torrance, CA (US)

(*) Notice: Subject to any disclaimer, the term of this patent is extended or adjusted under 35 U.S.C. 154(b) by 47 days.

(21) Appl. No.: 10/376,184

(22) Filed: Feb. 26, 2003

(65) Prior Publication Data

US 2004/0165178 A1 Aug. 26, 2004

(51) Int. Cl.⁷ .............................................. G01N 21/00
(52) U.S. Cl. .................................................... 356/73.1
(58) Field of Search ............................. 356/73.1, 35.5, 356/32, 477–479; 385/96, 12, 51, 73, 43; 250/227.14, 227.18, 231.1; 340/555–557

(56) References Cited

U.S. PATENT DOCUMENTS 4,420,251 A * 12/1983 James et al. .................. 356/32
4,733,068 A * 3/1988 Thiele et al. ............ 250/227.14

* cited by examiner

*Primary Examiner*—Tu T. Nguyen
(74) *Attorney, Agent, or Firm*—Leonard Tachner

(57) ABSTRACT

The central system component of the present invention is a flexible "smart cable" which enables accurate measurement of local curvature and torsion along its length. These quantities are then used to infer the position and attitude of one end of the cable relative to the other. Sufficiently accurate measurements of the local curvature and torsion along the cable allow reconstruction of the entire cable shape, including the relative position and orientation of the end points. The smart cable for making these measurements comprises a multicore optical fiber, with individual fiber cores constructed to operate in the single mode regime, but positioned close enough to cause cross-talk (mode coupling) between cores over the length of the fiber. This cross-talk is very sensitive to the distribution of strains (curvature and torsion) along the cable.

13 Claims, 2 Drawing Sheets

FIBER OPTIC SENSOR FOR PRECISION 3-D POSITION MEASUREMENT

BACKGROUND OF THE INVENTION

1. Field of the Invention

The present invention relates generally to optical fiber-based sensors and more particularly to a fiber optic sensor for precision 3-D position measurement using mode coupling between single-mode fiber cores in a multi-core optical fiber.

2. Background Art

The idea of using multicore optical fibers for sensors has been known since the late 70's, when much of the seminal work on optical waveguide coupling was published. Meltz and Snitzer were granted patents (Meltz and Snitzer, 1981; Snitzer and Meltz, 1981) in 1981 for a fiber optic strain sensor and for a fiber optic hot spot detector which rely on the cross-talk phenomenon in multicore fibers. Their hot spot detector also features the innovation of multifrequency interrogation for localization along the fiber. However, only two or three frequencies were envisioned because their application was to locate a single hot spot of limited spatial extent. The major concerns expressed in their strain sensor patent were to increase the unambiguous range of response and to separate strain-induced response from temperature-induced response—the issue of localization was not discussed.

The most extensive body of work has been published in the relevant literature by R. Romaniuk and collaborators (Romaniuk 1990, 1985). His group fabricated and characterized multicore optical fibers with many different core geometries. Although the major focus of their research seems to be the use of multicore fibers for multiplexed communication, they presented some test results from four-core sensors used to measure bending strain, bending radius direction (with respect to core geometry), pressure, and temperature. Correlation between amplitude changes at the output cores and specific measured quantities was determined empirically rather than via models. One relevant result is their determination of a bending radius directional sensitivity of better than 1 degree. This measurement was made by winding a short (1 m) multicore fiber around a strain test drum and monitoring changes in relative output amplitude as the fiber was "rolled" down the drum under constant strain.

Several patents discuss various methods for producing multicore fibers (e.g., Watanabe et al. 1989).

REFERENCES

G. Meltz and E. Snitzer (1981), "Fiber Optic Strain Sensor," U.S. Pat. No. 4,295,738.
E. Snitzer and G. Meltz (1981), "Fiber Optic Hot Spot Detector," U.S. Pat. No. 4,298,794.
R. Romaniuk (1990), "Special Fibres for Application Environments," Proc. SPIE-Int. Soc. Opt. Eng. vol. 1174, p. 332.
R. Romaniuk (1985), "Multicore Optical Fibres for Sensors," Proc. SPIE-Int. Soc. Opt. Eng. vol. 566, p. 276.
R. Romaniuk and J. Dorosz (1984), "A Family of Multicore Optical Fibre Based Sensors and Instrumentation Systems," Proc. SPIE-Int. Soc. Opt. Eng. vol. 514, p. 275.
M. Watanabe, H. Yokota, S. Suzuki and H. Suganuma (1989), "Method for Producing Multi-core Fiber," U.S. Pat. No. 4,832,720.

SUMMARY OF THE INVENTION

The central system component of the present invention is a flexible "smart cable" which enables accurate measurement of local curvature and torsion along its length. These quantities are then used to infer the position and attitude of one end of the cable relative to the other. The technology does not require a coherent source or time domain measurements, thus eliminating some technical difficulties associated with standard approaches to distributed optical fiber measurements.

The concept for such a device is based on the idea of inferring the shape of a thin cable from measurements entirely restricted to its interior. Sufficiently accurate measurements of the local curvature and torsion along the cable allow reconstruction of the entire cable shape, including the relative position and orientation of the end points. The smart cable for making these measurements comprises a multicore optical fiber, with individual fiber cores constructed to operate in the single mode regime, but positioned close enough to cause cross-talk (mode coupling) between cores over the length of the fiber. As shown in the discussion below, this cross-talk is very sensitive to the distribution of strains (curvature and torsion) along the cable.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 1:
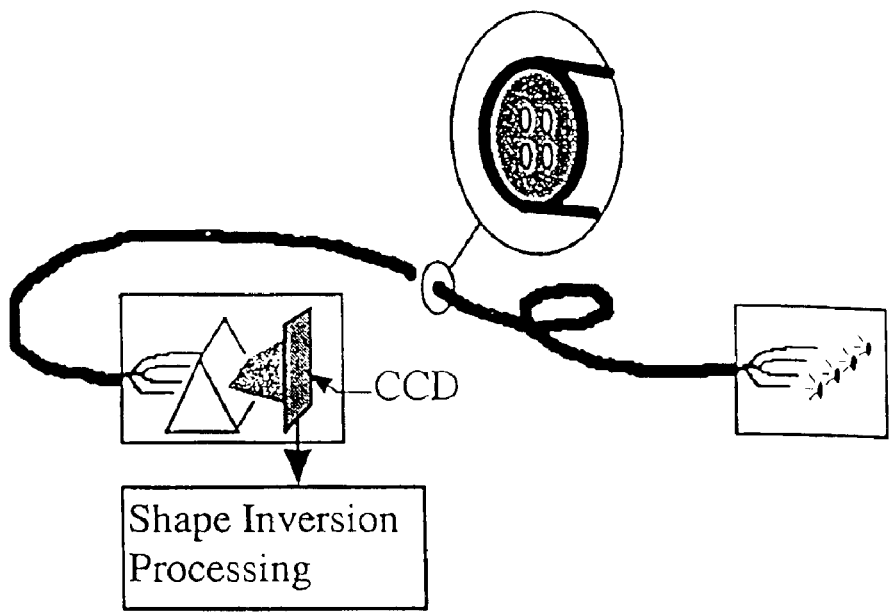
FIG. 1 is a simplified drawing of a preferred embodiment of the invention.

FIG. 1 is a sketch of the preferred embodiment of the invention. At one end of the fiber, the cores are illuminated sequentially by a broadband source and at the other end, the output intensities are resolved spectrally with a grating or prism and sensed with a CCD. The system is described by a frequency-dependent transfer matrix relating input to output core intensities. In general this transfer matrix is a strongly nonlinear function of the cable shape. A shape inversion algorithm which can cope with this nonlinearity is used to define the precise shape of the fiber cable.

In general terms, the invention may have various embodiments which take into account the following:

1. The relation between local fiber curvature and torsion and intercore mode coupling (cross-talk).
2. The shape inversion algorithm which functions over a useful range of cable configurations.
3. The minimum number of fiber cores required in principle to reconstruct cable shape from intensity-only measurements.
4. The effect of measurement noise, fiber imperfections, and sensitivity to environmental variables (such as temperature) on shape inversion performance.
5. The required material properties for the multicore fiber.

We first briefly review results for the cross-talk between modes on identical straight, parallel cores in a multicore fiber. All subsequent discussion applies to the case of weakly guided modes.

If we denote the mode amplitudes in each of the N cores by a vector $E=(E_1, E_2, \ldots E_N)$, then the electric field intensity in each of the cores is described by the equation $$\frac{dE}{ds} = \begin{pmatrix} i\beta & c_{12} & \cdots \\ -c_{12} & i\beta & \cdots \\ \vdots & \vdots & \ddots \end{pmatrix} E \quad (1)$$

where $\beta$ is the propagation constant for each core and $c_{ij}$ is the coupling between cores i and j. If there are only two cores then eq. (1) has the solution $$E(s) = e^{i\beta s} \begin{pmatrix} \cos cs & \sin cs \\ -\sin cs & \cos cs \end{pmatrix} E_0, \quad (2)$$

showing that energy is periodically exchanged between the cores with a beat length $L=2\pi/c$. This phenomenon has broad application in optical engineering, where it is used as a frequency-selective means to couple light between fibers.

The frequency dependence of c can be analyzed by applying perturbation theory to the modes. The resulting expression (Snyder and Love, 1983) for the coupling is:

$$c_{ij} = k \int dA(n-n'_i) \Psi_j^* \Psi_i / \int dA \Psi_i^* \Psi_i. \quad (3)$$

Here $\Psi_i$ denotes the mode solution to the scalar wave equation, $n'_i$ is the refractive index profile with core i only, and n is the refractive index profile with cores i and j. For step index profiles eq. (3) may be evaluated to give $$c_{ij} \cong \left( \frac{\pi(1-n_1/n_0)}{Wd_{ij}a} \right)^{1/2} \frac{U^2}{V^3} \frac{e^{-Wd_{ij}/a}}{K_1^2(W)} \quad (4)$$

where $n_1$, $n_0$ are the index of the cladding and core, respectively; a is the core radius, $d_{ij}$ is the separation between cores, and U, V, and W are the waveguide quantities $$U = a\sqrt{k_0^2 - \beta^2}$$

$$V = ka\Delta \quad W = a\sqrt{\beta^2 - k_1^2} \quad (5)$$

Here $\Delta = (n_0^2 - n_1^2)^{1/2}$ is the numerical aperture. The coupling dies off exponentially with core separation d, as expected from the evanescent nature of the fields in the cladding.

Figure 2:
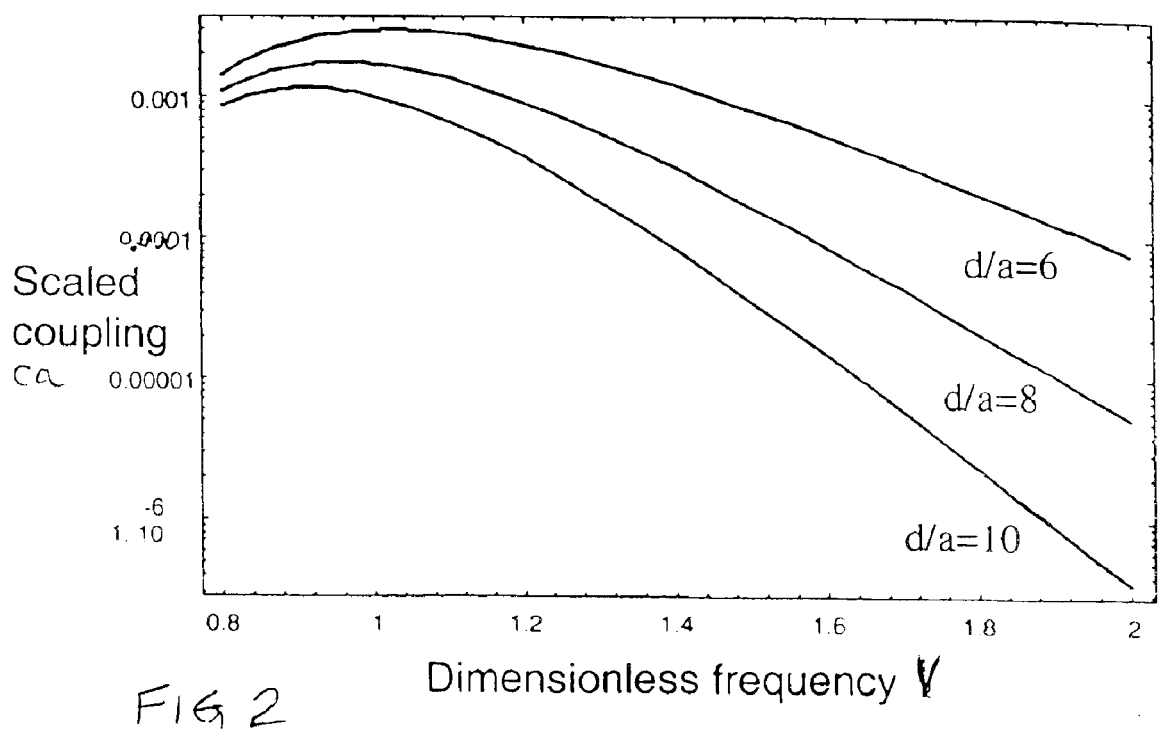
FIG. 2 is a graphical representation of a plot of scaled coupling constant Ca as a function of normalized frequency V.

In FIG. 2, the scaled coupling constant ca is plotted as a function of normalized frequency V. Note that the beatlengths are of the order 5 mm–5 m for a typical 1 $\mu$m core radius and midvisible—near IR frequency range. This is important because, as we demonstrate below, the beatlengths determine the spatial scales over which local changes in curvature and torsion can be resolved. The few mm-few m range of scales is one range of interest for the smart cable invention.

When the straight, untwisted multicore optical fiber considered above is bent and twisted, the coupling matrix in eq. (2) becomes a function of arclength s. The symmetry between pairs of cores is broken, so M assumes the general form $$M = \begin{pmatrix} i\beta_1(s) & c_{12}(s) & \cdots \\ -c_{12}^*(s) & i\beta_2(s) & \cdots \\ \vdots & \vdots & \ddots \end{pmatrix}. \quad (6)$$

The antihermitian property follows from energy conservation (bending losses have been ignored). In order to invert the cable shape from the measured transfer function, we must relate the elements of M to local geometric properties of the cable.

The dependence of the propagation constant $\beta$ on local curvature is straightforward to derive. Consider two parallel cores lying in the plane of curvature. There is a pathlength differential between the cores by virtue of the circular geometry. In addition, the differential strain on the outer and inner cores affects their indices of refraction through the strain-optic effect. Combining these contributions yields the relation $$\beta_1 - \beta_2 \equiv 2\delta\beta = \beta \left( 1 - \frac{n_0^2}{2}((1-\mu)p_{12} - \mu p_{11}) \right) \frac{d}{R} \quad (7)$$

where $\mu$ is the Poisson ratio $p_{11}$ and $p_{12}$ are components of the strain-optic tensor, d is the intercore separation, and R is the local radius of curvature.

Calculation of the dependence of C on curvature is more involved but is still amenable to standard waveguide analysis. As in the calculation of bending loss, it is expedient to represent the curved fiber as a straight fiber with a modified index of refraction $$n_c^2 = n^2 + 2n_1^2 \frac{x}{R} \quad (8)$$

where x is the coordinate with respect to the center of strain in the plane of curvature. The effective term in the refractive index couples the guided mode to radiation and leaky modes, with matrix elements which can be calculated using perturbation theory. Further application of perturbation theory analogous to eq. (3) will yield the final geometry-dependent coupling.

Analysis of torsion is similar to that of curvature, except that the cores no longer lie in the same plane. The final product of this analysis are coupling matrix elements, expressed as wavelength and core geometry-dependent coefficient matrices times curvature and torsion terms.

Formulation of a shape inversion algorithm is based on the observation that the transfer function is sensitive to the position along the cable where a given curved/twisted segment lies. If the local curvature/torsion of a short segment are held constant while the segment is "slid along" the cable, the transfer matrix will change. This is demonstrated by using perturbation theory to solve eq. (1).

To simplify the problem we remove an overall phase factor, $$E = e^{i \int_0^s ds' \bar{\beta}(s')} e \quad (9)$$

with $$\bar{\beta}(s) = \frac{1}{N} \sum_{i=1}^{N} \beta_i(s). \quad (10)$$

This factor cannot be measured without comparing to an external reference, and in any event does not contain useful information about the cable shape. Then eq. (1) becomes $$\frac{de}{ds} = \begin{pmatrix} i\delta\beta_1(s) & c_{12}(s) & \cdots \\ -c_{12}^*(s) & i\delta\beta_2(s) & \cdots \\ \vdots & \vdots & \ddots \end{pmatrix} e \equiv Me \quad (11)$$

where $\delta\beta_i = \beta_i - \beta_i$. Define a transfer matrix G(s) such that $$e(s) = G(s)e_0, \quad (12)$$

where $e_0$ is the vector of illumination amplitudes. Then $$\frac{dG}{ds} = MG \quad (13)$$

with G(0)=1. Because in general M(s) does not commute with M(s') it is not possible to simply integrate eq. (13) to find a solution, though we do know that it is an element of the matrix group SU(N).

The effect of adding a small kink in the cable is represented as a perturbation δM of the coupling matrix. Then standard perturbation theory provides a first-order expression for the change in G:

$$\delta G \approx G(s) \int_0^s ds' G^{-1}(s') \delta M(s') G(s'). \quad (14)$$

Since G changes with s' this demonstrates the assertion that the transfer matrix G+δG depends on the location of the kink δM.

In the special case that M is constant (independent of arclength s), shape inversion becomes simple Fourier analysis. For M to be constant means that the cable is in a constant strain configuration, i.e., either a circular arc or a helix. In this case G may be written in terms of the normalized eigenvectors of M, viz.

$$G = \sum_{j=1}^N e^{\lambda_j s} \hat{e}_j \hat{e}_j^+ \quad (15)$$

where $$M\hat{e}_j = \lambda_j \hat{e}_j; \quad \hat{e}_j^+ \cdot \hat{e}_k = \delta_{jk}. \quad (16)$$

Since M is antihermitian the $\lambda_j$ are pure imaginary. Recall the decomposition of δM into curvature and torsion components $$\delta M = \delta M_{k1} k_1(s') + \delta M_{k2} k_2(s') + \delta M_\tau \tau(s') \quad (17)$$

where $\delta M_{k1}$, etc. are known functions of wavelength and core geometry. Then in terms of eigenvectors eq. (14) becomes $$\delta G \approx G(s) \sum_{k=1}^N \sum_{j=1}^N \Big( <j|\delta M_{k1}|k> \int_0^s ds' e^{ik_{jk}s'} \kappa_1(s') + $$
$$<j|\delta M_{k2}|k> \int_0^s ds' e^{ik_{jk}s'} \kappa_2(s') +$$
$$<j|\delta M_\tau|k> \int_0^s ds' e^{ik_{jk}s'} \tau(s') \Big) \hat{e}_j \otimes \hat{e}_k^+ \quad (18)$$

where we have defined $ik_{jk} = \lambda_j - \lambda_j$. If the spatial Fourier content of δM is cut off at high wavenumber, then the collection of eqs. (18) for a spectrum of light wavelengths (and hence a continuous $k_{jk}$) comprises a closed set of linear equations for the Fourier components of curvature and torsion. Even if we only measure the intensity of light at the output end of the cable, i.e., the magnitude of G+δG, with enough cores (and hence enough different eigenvectors $e_j$) it is still possible to determine the Fourier components of curvature and torsion. One aspect of the invention is a determination of the minimal number and arrangement of cores required to produce an invertible system for intensity-only measurements of the transfer matrix.

Eqs. (18) do not necessarily constitute the answer sought in this task because the conditions required for perturbation theory to apply are not valid for a usefully wide range of cable shapes. For example, consider the expression eq. (7) for the change in β as a function of bend radius. If $\delta\beta = \beta d/R$ is comparable to or larger than the inverse beatlength c, then perturbation theory is invalid. For small or moderate radii of curvature this will happen whenever the system is probed with a short wavelength, giving small c as per FIG. 2. Thus eq. (18) is a useful solution only for very gentle curvature perturbations around the basic cable shape. However, it is important to keep in mind that there are other applications of multicore fiber sensors, e.g., distributed strain measurement, for which a perturbation solution like eq. (18) is a perfectly adequate method for inverting measure and values along the fiber.

Other methods besides perturbation theory can be used to develop analytic solutions to eq. 13. This equation is basically similar to the time-dependent Schrodinger equation of quantum mechanics, and the same approximation techniques apply.

Such standard techniques include, for example:

The sudden approximation, used when changes in the coupling (potential) are isolated and of short extent. For our problem this corresponds to configurations with sharp kinks separated by segments with constant curvature/torsion.

The adiabatic approximation, useful when the normalized rate of change of the coupling matrix elements is small compared to the eigenvalues of that matrix.

The adiabatic approximation in particular should apply for many cable configurations.

Because of the special group properties of the solution to eq. (13) other, non-pertubative methods may be brought to bear on the shape inversion problem.

Although a shape inversion algorithm is important, it is not the whole story. The algorithm must work in the real world, where measurements are always noisy and system parameters are never completely specified. To see why this might be a particular concern for the smart cable, consider the somewhat simpler problem of determining the endpoint position of a 2D curve if the curvature is measured everywhere along the curve. If one end of the curve is at the origin, the other end is at $$z = \int_0^S ds e^{i \int_0^s ds' \kappa(s')} \quad (19)$$

where k denotes curvature, S is the arclength of the curve, and we are representing the endpoint position at (x, y) by the complex number z=x=iy. Assume the measured value K is contaminated by noise δk, so that k=$\bar{k}$+δk where $\bar{k}$ is the true value. For simplicity also assume that the noise is a zero mean white Gaussian random process, so that $$<\delta k(s) \delta k(s')> = K^2 \delta(s-s'). \quad (20)$$

Then a short calculation determines the variance of the estimated end position as $$<|z-\tilde{z}|^2> = \int_0^S ds_1 \int_0^S ds_2 e^{i\int_{s_2}^{s_1} ds' \kappa(s')}(1 + e^{-\frac{1}{2}|s_1-s_2|K^2} - e^{-\frac{1}{2}s_1 K^2} - e^{-\frac{1}{2}s_2 K^2}). \quad (21)$$

If $K^2S<<1$ then the r.m.s. error grows line $KS^{3/2}$. For larger parameter errors accumulate rapidly and the r.m.s. error becomes on the order of S, i.e., the reconstructed end position is completely random.

The errors in measured curvature can be divided into three classes: those due to instrument noise, systematic errors due to fabrication defects (core geometry, index of refraction variations, etc.) and sensitivity to extrinsic variables such as temperature. Of the three, instrument noise is probably the worst threat to successful shape inversion. There are several approaches to mitigating effects of instrument noise, including time averaging and diversity measurements using fibers with redundant cores or multiple multicore fibers. A plurality of single mode cores may also be provided in an optical medium comprising a flexible sheet of material.

The simplistic $\delta$-correlated noise model used in the analysis above leads to overpessimistic estimate of the rate of r.m.s. position error growth with cable length. In reality, the intrinsic mechanical stiffness of the cable places a practical limit on bend radius, effectively limiting the size of the configuration space of the cable. This reduces the number of measurements required to invert for the shape, consequently reducing the rate at which errors accumulate. Thus, there is a tradeoff between a system design with a stiff, cumbersome cable but high positional accuracy and a less accurate system with a more flexible cable.

There is also a potential system sensitivity to systematic and extrinsic noise. If achievable manufacturing tolerances seem likely to cause appreciable errors in shape inversion, it may be possible to calibrate the errors out by locking the cable into a series of known, fixed positions and determining the distribution of erroneous curvature/torsion readings along the cable. There is also a potential sensitivity of shape inversion to ambient temperature. Some form of temperature compensation may be required for the smart cable to operate. If this can be done by making a local temperature measurement, say at one end of the cable, then system design implications are minimal. If shape inversion performance shows strong sensitivity to the small thermal gradients typically encountered indoors, a more complex compensation scheme may be desired.

Figure 3:
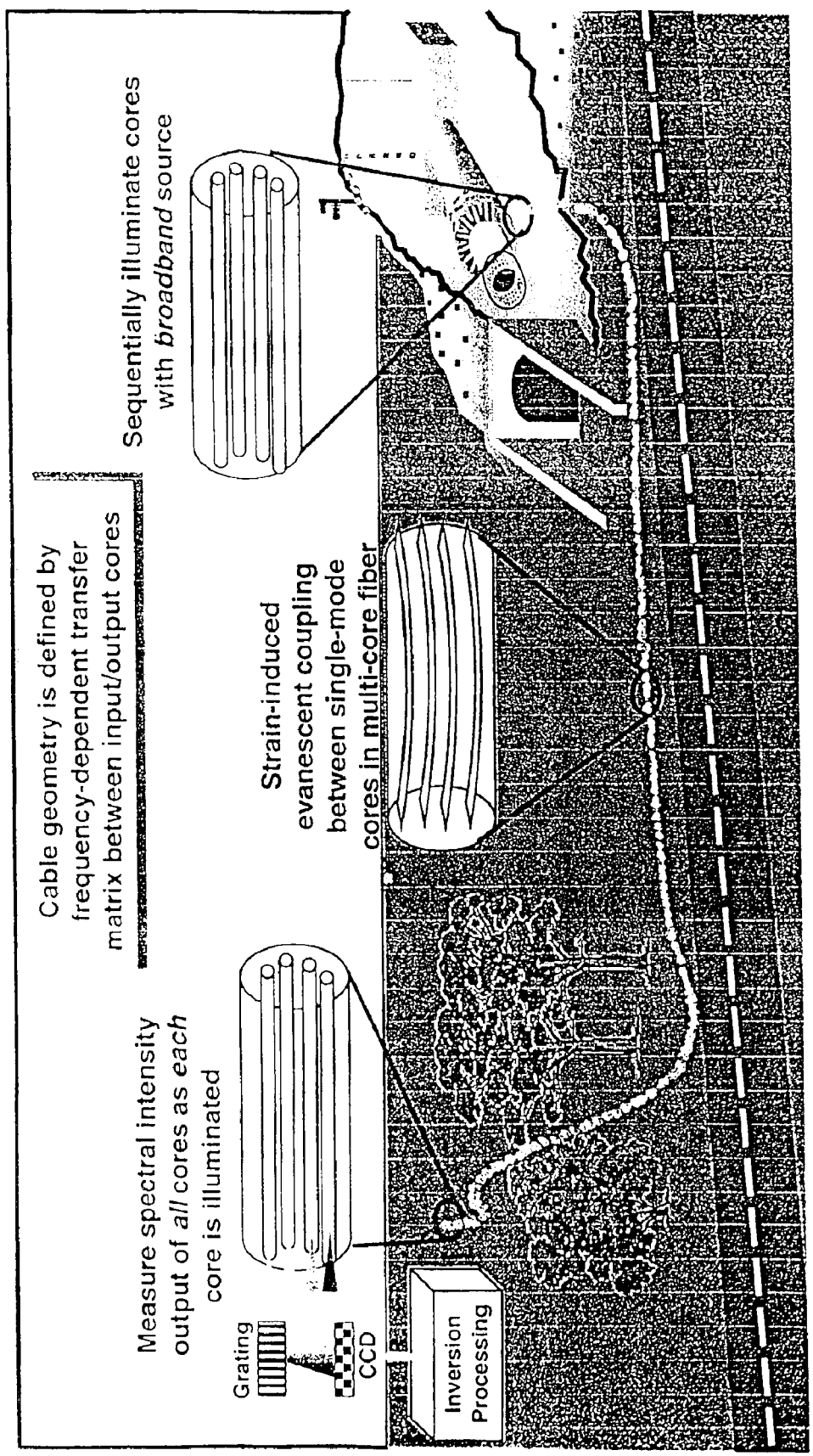
FIG. 3 is a simplified drawing of an underground position sensing use of the disclosed embodiment of the invention.

FIG. 3 illustrates a scenario of underground position sensing by employing the disclosed embodiment of the present invention. As shown therein, such a system may be employed for a wide range of underground payload insertion missions even at relatively long standoff ranges.

Having thus disclosed a preferred embodiment of the invention, it being understood that various modifications and additions are contemplated, such as the precise number of single-mode cores required for selected levels of measurement, distance and accuracy, the scope hereof is to be limited only by the claims appended hereto and their equivalents.

I claim:

1. Apparatus comprising an optical medium having curved sections, said medium including a plurality of single mode cores, said cores being closely spaced to exhibit cross-talk therebetween, said cross-talk exhibiting changed values only at bends in said medium, said apparatus including a broadband source for illuminating said cores sequentially, means for measuring the spectral intensities including the magnitude of light signals at different freguencies of the entire plurality of cores each time a core is illuminated, and means responsive to said spectral intensities for determining the positions of said curved sections.

2. Apparatus as in claim 1 wherein said medium comprises an optical fiber.

3. Apparatus as in claim 1 wherein said optical medium comprises a flexible sheet of material, said sheet having embedded therein said plurality of single mode cores.

4. Apparatus as in claim 3 wherein said cores are organized in groups, wherein only the cores of each group exhibit cross-talk therebetween.

5. A positioning sensor comprising an optical fiber cable having multiple, closely positioned single mode cores;

a broadband illumination source for sequentially illuminating said cores;

a spectral intensity measurement device for measuring the spectral characteristics including the magnitude of light signals at different freguencies of all of said cores after each said core is illuminated by said source; and an inversion calculation apparatus for determining local curvature and torsion along said fiber cable and calculating cable end-point position and orientation from said spectral intensity measurements.

6. The sensor recited in claim 5 wherein said measurement device comprises a CCD.

7. The sensor recited in claim 5 wherein said measurement device comprises a grating.

8. The sensor recited in claim 5 wherein said measurement device comprises a prism.

9. The sensor recited in claim 5 wherein said single mode cores are positioned for promoting cross-talk therebetween at fiber cable locations subject to local curvature or torsion.

10. A method for measurement of the position of one end of a fiber optic cable relative to a known position of another end of the fiber optic cable, the cable having a plurality of closely-positioned single-mode cores; the method comprising the steps of:

a) illuminating each of said cores with a source of boradband energy;

b) measuring the spectral intensities including the magnitude of light signals at different frequencies of all of said cores as each said core is illuminated;

c) determining the curvature and torsion characteristics of said cable based upon said spectral intensities; and d) inferring the position of said one end from said curvature and torsion characteristics.

11. The method recited in claim 10 wherein said measuring step b) is carried out by taking into account the cross-talk induced between said cores by said curvature and torsion.

12. The method recited in claim 10 wherein said measuring step b) comprises the steps of spectrally resolving the resulting illumination in each said core and detecting the resolved illumination spectrum in each said core.

13. The method recited in claim 10 further comprising the step of calibrating said fiber optic cable by placing said cable in a selected positional configuration; carrying out steps a) through d); and compensating for known measurement errors along said cable.

* * * * *